United States Patent
Lefort

(10) Patent No.: US 11,758,085 B2
(45) Date of Patent: Sep. 12, 2023

(54) VIDEO SIGNAL MIXING DEVICE CONFIGURED SO AS TO INTERFACE A DISPLAY COMPUTER AND A HEAD-UP DISPLAY OF AN AIRCRAFT

(71) Applicant: Airbus Operations SAS, Toulouse (FR)

(72) Inventor: Maxime Lefort, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/679,612

(22) Filed: Feb. 24, 2022

(65) Prior Publication Data

US 2022/0279135 A1 Sep. 1, 2022

(30) Foreign Application Priority Data

Feb. 25, 2021 (FR) ...................................... 2101847

(51) Int. Cl.
*H04N 5/265* (2006.01)
*H04N 9/76* (2006.01)

(52) U.S. Cl.
CPC ............... *H04N 5/265* (2013.01); *H04N 9/76* (2013.01)

(58) Field of Classification Search
None
See application file for complete search history.

(56) References Cited

U.S. PATENT DOCUMENTS

| 5,041,998 A | 8/1991 | Lawrence et al. |
| 9,244,280 B1 * | 1/2016 | Tiana ...................... G09G 5/00 |
| 2010/0207843 A1 * | 8/2010 | Coloma ................. G02B 27/01 345/1.1 |
| 2010/0231705 A1 * | 9/2010 | Yahav .................... G02B 27/01 348/E7.091 |

FOREIGN PATENT DOCUMENTS

| CN | 104348851 A * | 2/2015 | ............. B60K 35/00 |
| EP | 0430701 A2 | 6/1991 | |
| JP | 2001119659 A | 4/2001 | |

OTHER PUBLICATIONS

French Search Report; priority document.

* cited by examiner

*Primary Examiner* — Duane N Taylor, Jr.
(74) *Attorney, Agent, or Firm* — Greer, Burns & Crain, Ltd.

(57) ABSTRACT

A mixing device for mixing a first video signal and a second video signal to form a third video signal, the device comprising electronic circuits configured such that the third video signal is representative of the first video signal when the amplitude of a control signal is lower than a first predetermined threshold, such that the third video signal is representative of the second video signal when the amplitude of the control signal is greater than a second predetermined threshold, or else such that the third video signal is representative of a combination of the first and second video signals when the amplitude of the control signal lies between the two predetermined thresholds or is equal to one of them. A mixing method is performed by the abovementioned mixing device.

9 Claims, 8 Drawing Sheets

VIDEO SIGNAL MIXING DEVICE CONFIGURED SO AS TO INTERFACE A DISPLAY COMPUTER AND A HEAD-UP DISPLAY OF AN AIRCRAFT

CROSS-REFERENCES TO RELATED APPLICATIONS

This application claims the benefit of the French patent application No. 2101847 filed on Feb. 25, 2021, the entire disclosures of which are incorporated herein by way of reference.

FIELD OF THE INVENTION

The present invention relates to a video signal mixing device, to a head-up display system for a cockpit of an aircraft, and to an aircraft comprising such a display system. The present invention relates more particularly to a video signal mixing device for interfacing a display computer and a head-up display, HUD, of an aircraft.

BACKGROUND OF THE INVENTION

Aircraft conventionally comprise one or more displays known as "head-up" displays, allowing a pilot to view information relating to the navigation and to the control of the flight of the aircraft, while at the same time viewing the external surroundings through the windshield of the cockpit of the aircraft. Such a display is arranged between the head of a pilot located in a position for piloting the aircraft and the windshield of the aircraft. The pilot is thus able to view information that is displayed without diverting his gaze from the exterior of the aircraft. The display of information on a head-up display is controlled by a display controller, also called display computer, connected to systems for navigation and for controlling the flight of the aircraft. In some aircraft, the head-up display system is used only or primarily in phases of takeoff, landing, departure or approaching an airport. However, the display system could prove highly useful for other flight phases and other tasks, such as for example validating new functions during test phases, in flight tests. Indeed, validating new avionic functions, such as, by way of example, a new navigation tool being displayed in the cockpit of an aircraft, requires guaranteeing flight safety. It is thus not possible, in a test aircraft, to implement software that has not been validated in tests on the ground, especially if executing new avionic functions to be tested risks misleading the pilot or causing a malfunction with the aircraft systems. For example, new functions of an enhanced flight vision system (EFVS), allowing a pilot to be given an enhanced synthetic image of the external scene on a head-up display, could be tested on an HUD display natively installed in an aircraft.

Such use of an HUD for test purposes is however not possible without modifying or adapting the HUD display natively installed on board the aircraft, or the head-up display computer itself also natively installed on board, without having to perform new validation and/or qualification tests, which would be lengthy and expensive.

The situation may therefore be improved.

SUMMARY OF THE INVENTION

One aim of the present invention is to propose a mixing device for mixing a first video signal and a second video signal to form a third video signal, the mixing device comprising electronic circuits configured such that the third video signal is representative of the first video signal when the amplitude of a control signal is lower than a first predetermined threshold and such that the third video signal is representative of the second video signal when the amplitude of the control signal is greater than a second predetermined threshold.

It is thus advantageously possible to use a head-up display native to the aircraft, controlled by a head-up display computer itself also native to the aircraft, without having to modify one or the other of these items of on-board equipment, the video mixing device performing mixing that allows controlled insertion of additional information into the information displayed by a head-up display.

According to one embodiment, the electronic circuits of the mixing device are configured such that the third video signal is furthermore representative of a fourth video signal, called intermediate video signal, which is the result of a function, called mixing function, performed based on the first video signal and the second video signal when the amplitude of the control signal is between the first predetermined amplitude threshold and the second predetermined amplitude threshold, or equal to one of the predetermined amplitude thresholds.

According to one embodiment, the mixing device is designed and configured such that the first video signal is a component of a first composite video signal, and the second video signal is a component of a second composite video signal, and the control signal is a component of the first composite video signal other than the first video signal or else a component of the second composite video signal other than the second video signal.

Advantageously, the function performed based on the first video signal and based on the second video signal by the mixing device is chosen from among the following list: minimum, maximum, average.

According to one embodiment, the mixing device is designed and configured such that the first composite video signal and the second composite video signal each comprise three components respectively coding the color red, the color green and the color blue, wherein the control signal is a component coding the color red of the second composite video signal, and wherein the third video signal is a component coding the color green of a third composite video signal.

Another subject of the invention is a display system comprising a head-up display, HUD, a first display computer, a second display computer and a mixing device as described, in which system the first video signal is generated by the first display computer, the second video signal is generated by the second display computer and the third video signal is configured so as to control a display on the head-up display, HUD, of an aircraft.

An additional subject of the invention is an aircraft comprising a display system as mentioned above.

The invention also relates to a method for mixing a first video signal and a second video signal to form a third video signal, executed in a video mixing device comprising electronic circuits, the mixing method being able to form a third video signal configured so as to control a display on a head-up display device representative of a first video signal when the amplitude of a control signal is lower than a first predetermined threshold and to form the third video signal so that the third video signal is representative of a second video signal when the amplitude of the control signal is greater than a second predetermined threshold, the first and second video signals being respectively delivered by a head-up display computer and a second display computer, for example a computer for displaying in-flight tests.

A final subject of the invention is a computer program product comprising program code instructions for executing the steps of the method described above when the program is executed by a processor, and an information storage medium comprising such a computer program.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
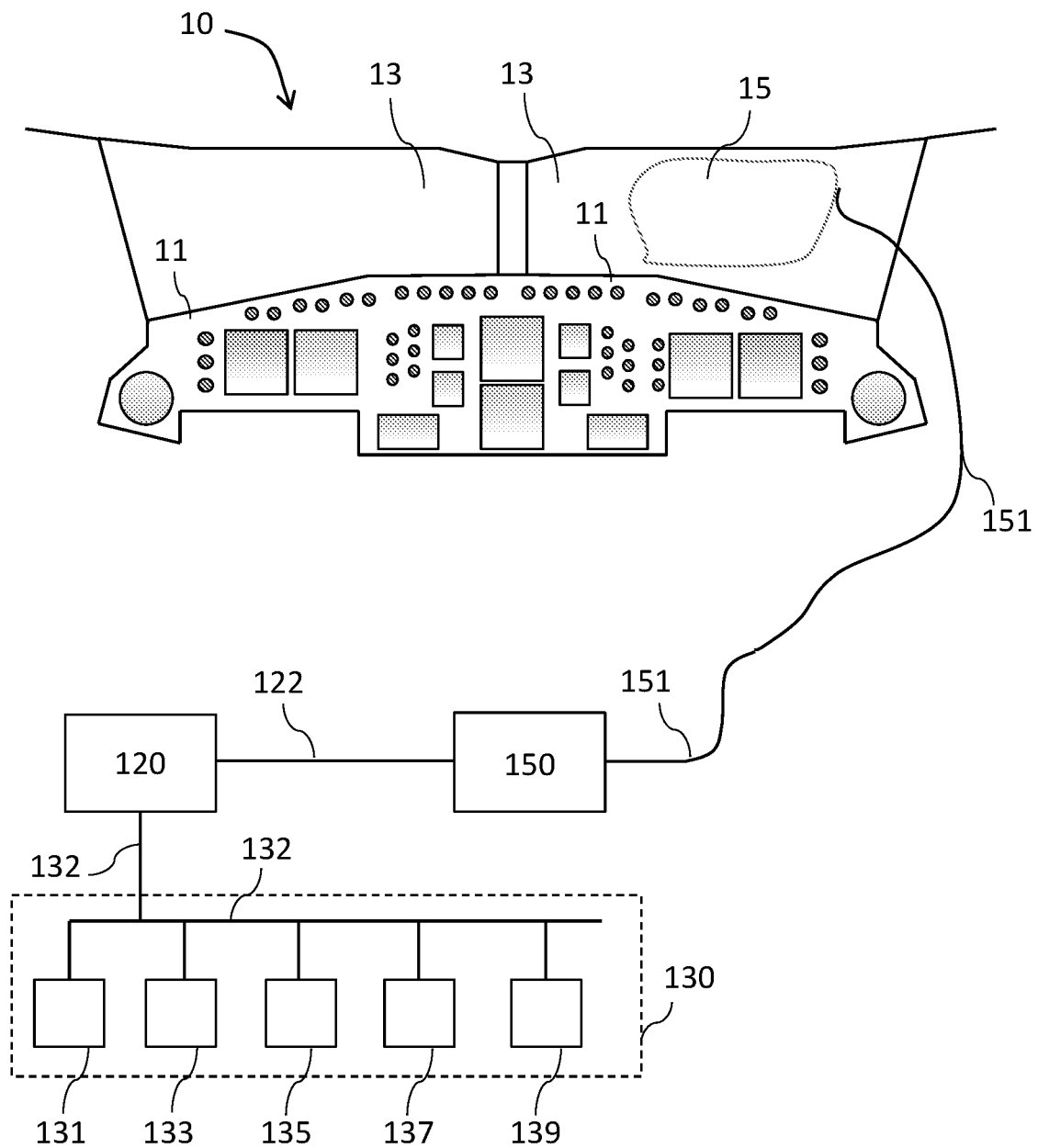
FIG. 1 is a partial schematic depiction of a cockpit of an aircraft comprising an instrument panel and a windshield in front of which there is arranged a head-up display device controlled by a display computer native to the aircraft.

FIG. 1 is a schematic depiction illustrating an operational position of a head-up display device 15, also conventionally called HUD display, in a cockpit 10 of an aircraft housing an avionic display system, which avionic display system comprises a head-up display computer 150, according to one embodiment. The head-up display device 15 is positioned above an instrument panel 11 comprising a large number of instrumentation devices and/or devices for controlling the flight of the aircraft. The head-up display device 15 is positioned in front of a windshield 13 of the aircraft, such that a pilot situated in a position for piloting the aircraft facing the head-up display device is able to view information displayed by this display device while at the same time simultaneously viewing the surroundings outside the aircraft.

According to the example shown, the head-up display device 15 is positioned on the starboard side of the cockpit 10. Of course, the head-up display device 15 could be positioned on the port side of the cockpit 10, or else two head-up display devices could be installed respectively on the port side and on the starboard side of the cockpit, facing each of the two piloting stations as are conventionally arranged in a cockpit of an aircraft. The described example is intended to detail modes for controlling the head-up display 15 of an aircraft from one or more display computers connected to the head-up display device 15 according to one embodiment, and there is then no point in describing the control of more than one head-up display in order to describe the invention.

According to one embodiment, the head-up display computer 150 is connected to a data processing device 120 via a communication bus 122. According to one embodiment, the data processing device 120 is a data recorder device that makes it possible to provide avionic data with a view to being displayed in the cockpit. The data processing device 120 may be connected to an avionic installation 130 of the aircraft via a communication bus 132. According to one variant, the data processing device 120 does not have a recording function and implements primarily mixer and/or converter or even relay functions, at the output of a flight control assistance avionic installation. According to one variant of the embodiment, the data processing device is not implemented, and the head-up display computer is then connected directly to the avionic installation 130 via the buses 122 and 132, which then form just one single bus (not shown in FIG. 1). The head-up display computer 150 is connected to the head-up display device 15 via a video link 151. The communication buses 122 and 132 are bidirectional buses using technologies compatible with the operational and certification requirements of the avionic systems. The data processing device 120 is, for example, an on-board computer. According to one embodiment of the invention, the data processing device 120 works together with the avionic installation 130 to allow data to be processed and/or recorded by the data processing device 120. The data processing device 120 thus works like a scanning device that scans the data exchanges that take place via the avionic systems of the aircraft. The data processing device 120 is configured so as to acquire, through scanning or in accordance with protocol exchanges, all or some of the avionic data that flow in the avionic installation 130 of the aircraft. This involves avionic data that are said to be real, that is to say, not simulated and used to pilot the aircraft. The head-up display computer 150 accesses these data in real time, such that the information presented to the pilots on the head-up display device 15 is representative of the flight conditions and parameters. The data processing device 120 comprises a data server software module that allows the display computer to subscribe to a list of avionic parameters. For this purpose, the display module 150 may use services of an execution and piloting computer coupled to the data processing device 120 (not shown in FIG. 1). According to one embodiment, the data processing device 120 comprises an Ethernet switch for distributing data to remote equipment, such as an execution and piloting module or else the head-up display computer 150.

The avionic installation 130 comprises a plurality of sensor modules or computer modules 131, 133, 135, 137, 139 each configured so as to measure physical quantities or positions of actuators or elements of the aircraft, or else to deliver output data computed from input data. The measured physical quantities or the computed data may be representative of flight parameters. For example, the module 131 delivers information representative of the air speed of the aircraft based on a static pressure and a dynamic pressure, the sensor 133 delivers information representative of the position of the aircraft in space expressed by its longitude, its latitude and its altitude, the module 135 delivers information representative of the altitude of the aircraft based on a static pressure measurement and programmed information regarding an atmospheric reference pressure at sea level, the module 137 delivers information representative of the amount of fuel available in the tanks of the aircraft, and the module 139 is a computer configured so as to deliver information representative of the minimum flying time to reach the nearest airport facilities, specifically on the basis of the weather conditions known at a given time. All of these examples are non-limiting. The number of sensor modules or computer modules may be very large, and the modules may be configured so as to interact with one another as needed. The sensor modules or computer modules communicate with the data processing device 120, or one another, using aeronautical technologies and in accordance with predefined communication protocols well known to a person skilled in the art. The head-up display device 15 is a display device native to the cockpit of the aircraft. The terms "display device native to the cockpit" in this case denote a conventional display device housed in and integrated into the cockpit of the aircraft when it is manufactured, or in a subsequent upgrade to the avionic equipment during an update or maintenance operation on the aircraft Similarly, the head-up display computer 150 is a head-up display computer native to the aircraft, this meaning that it is a conventional display device housed in and integrated into the aircraft when it is manufactured, or in a subsequent upgrade to the avionic equipment during an update or maintenance operation on the aircraft.

Figure 2:
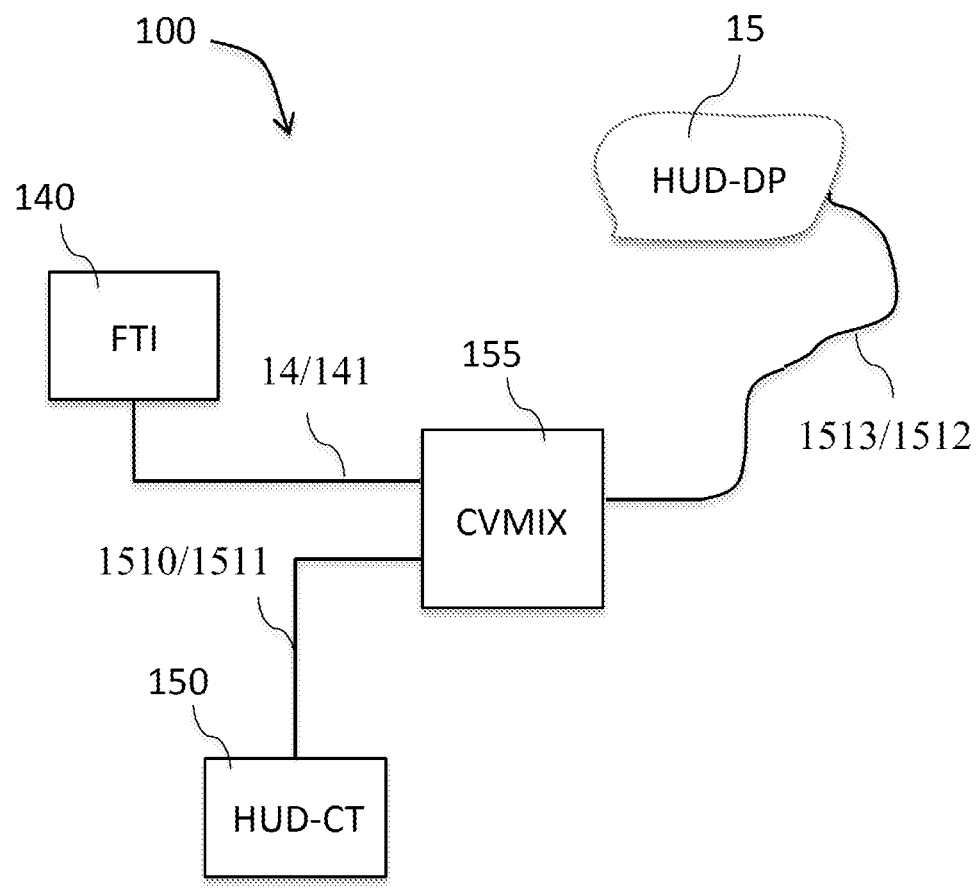
FIG. 2 is a schematic depiction of a display system of an aircraft similar to the one already shown in FIG. 1, comprising a video mixing device according to one embodiment of the invention.

FIG. 2 schematically illustrates a display system 100 of an aircraft similar to the one already shown in FIG. 1, in which a mixing device CVMIX 155 is cleverly configured and inserted so as to interface the head-up display device 15, which is native to the aircraft, with the head-up display computer 150, which is also native to the aircraft, according to one embodiment of the invention. The head-up display device 15 is also called HUD-DP device in FIG. 2, and the head-up display computer 150 is also called HUD-CT in this same figure. Thus, due to the introduction of the mixing device CVMIX 155, the link 151 for transmitting information to be displayed by way of the head-up display device 15 under the control of the head-up display computer 150 shown in FIG. 1 is broken down into two links 1510 and 1513. The first link 1510 connects one or more outputs of the head-up display computer 150, which is native to the aircraft, to one or more inputs of the mixing device CVMIX 155, and the second link 1513 connects one or more outputs of the mixing device CVMIX 155 to one or more inputs of the head-up display device HUD-DP 15, which is native to the aircraft. The mixing device CVMIX 155 essentially comprises at least two inputs. According to the embodiment described in FIG. 2, the mixing device CVMIX 155 comprises two inputs and one output and is configured such that information available at the output thereof is representative of the information presented on a first input, or information represented on a second input or else a combination of the information presented on its first and second inputs. "Information representative of other information" is understood here to mean information that has the same evolution profile over time and that is identical or that is different, but different only to within a scaling factor. Thus, for example, a second analogue video signal that might have the same shape as a first analogue video signal but with twice the amplitude of this first analogue video signal is considered to be representative of the first analogue video signal Similarly, a second digital video signal, the values of the digital samples of which have, over time, relative variations that are identical in terms of amplitude to those of a first digital video signal, is considered to be representative of this first digital video signal, whether the sample values are equal in pairs or the values comply with the same multiplication factor in pairs. Furthermore, a digital video signal is considered to be representative of an analogue video signal after the first analogue video signal has been converted by way of an analogue-to-digital converter, is possibly globally amplified or reduced, and vice versa.

According to one embodiment, the information applied to the inputs of the mixing device CVMIX 155 and the purpose of which is to control the display of payload information implemented by the head-up display device HUD-DP 15 is video signals. According to one embodiment of the invention, the video signals applied to the inputs of the mixing device CVMIX 155 are digital signals that each code, for example a luminance level of a display point or an amplitude of a color component of a display point, besides any signals for synchronizing or locating a display point. For example, the digital video signals are in accordance with the SDI format. According to another embodiment of the invention, the video signals applied to the inputs of the mixing device CVMIX 155 are analogue signals that each code for example a luminance level of a display point or an amplitude of a color component of a display point, besides any signals for synchronizing or locating a display point.

Thus, inserting and configuring the device CVMIX 155 cleverly makes it possible to interface (to connect) the head-up display device HUD-DP 15 to a display computer device, called "other display computer" 140, in addition to the head-up display computer HUD-CT 150. According to the example of interfacing illustrated in FIG. 2, the "other" display computer device is a display computer dedicated to in-flight tests, also called FTI. The display computer device FTI 140 is connected to the mixing device CVMIX 155 by a connection link 14.

Using the mixing device CVMIX 155 thus makes it possible to display information originating from the head-up display computer HUD-CT 150 or from the "other" display computer FTI 140 in order to display information in particular linked to in-flight test parameters or conditions, or else a combination of both.

In the remainder of the description, the same name will be used to define a video signal and the connection link carrying this video signal, for the sake of simplicity. Thus, by way of example, the video signal carried by the connection link 14 may be called video signal 141 and the video signal carried by the link 1511 may be called video signal 1511. Similarly, the video signal at the output of the mixing device CVMIX 155, carried by the connection link 1513, may be called video signal 1512.

As a result of the described configuration, the video mixing device CVMIX 155 works in the display system 100 as a video mixing and/or video insertion device, and therefore consequently as a device for inserting information to be displayed on the head-up display device HUD-DP 15, which is native to the aircraft. Advantageously and due to this configuration, it is possible to use the head-up display device HUD-DP 15 of the aircraft for display functions (avionic functions) other than those initially intended, specifically without requiring any modifications to the equipment native to the aircraft, namely the head-up display computer devices HUD-CT 150 and the head-up display device HUD-DP 15.

According to one embodiment of the invention, the video signals 141 and 1511 are each video components of composite video signals. The terms "composite video signals"

should be interpreted here as denoting video signals whose payload information is carried by multiple components. For example, a composite video signal may be what is called an R-G-B signal that comprises three distinct components R, G and B, which each code a brightness of an elementary color from among the colors red, green and blue for a given point of an image (a pixel for example). In the same way, what is called a Y/C video signal comprises two components Y and C, one of which codes the luminance of successive points of an image and the other of which codes the chrominance of the same successive points of the same image.

According to the preferred embodiment, the video signals 141 and 1511 are each components coding the color green of RGB composite video signals, and the video signal 1512 available at the output of the mixing device CVMIX 155 is a component coding the color green of an RGB composite video signal configured so as to be compatible with an RGB input format of the head-up display device HUD-DP 15.

According to one embodiment of the invention, the mixing device CVMIX 155 is configured so as to mix the first video signal 1511 at the input of the mixing device CVMIX 155 and the second video signal 141 at the input of the mixing device CVMIX 155 to form a third video signal 1512 that is delivered at the output of the mixing device CVMIX 155. For this purpose, the mixing device comprises electronic circuits configured such that the third video signal 1512 at the output of the mixing device is representative of the first video signal 1512 when the amplitude of the internal control signal is lower than a first predetermined threshold and such that the third video signal 1512 is representative of the second video signal 141 when the amplitude of the internal control signal is greater than a second predetermined threshold.

According to one embodiment, the head-up display device HUD-DP 15 implements a display solely based on the component video signal 1512 coding the color green of the RGB composite video signal presented thereto at input, such that the other two R and B component video signals, respectively coding the colors red and blue, are ignored by the internal electronic processing circuits of the head-up display device HUD-DP 15.

According to one embodiment of the invention, the R and B signals respectively coding the colors red and blue at the input of the device HUD-DP 15 are of no use for displaying information on the display, but are used to check the integrity of the RGB composite video signal in its entirety.

Cleverly, one of the component video signals coding the color red or blue of the composite video signal comprising the video signal 141, originating from the display computer FTI 140, is used as internal control signal of the mixing device CVMIX 155.

According to one embodiment of the invention, the red component video signal of the RGB video signal originating from the display computer FTI 140 is cleverly used as internal control signal for the mixing performed by the mixing device CVMIX 155, such that the mixing between the video sources, namely the native display computer HUD-CT 150, on the one hand, and the "other" display computer FTI 140 dedicated to in-flight tests, on the other hand, is able to be controlled based on the red component video signal of the "other" display computer FTI 140.

It is thus advantageously possible to "take control" of the head-up display device HUD-DP 15 from an item of display computer equipment FTI 140 dedicated to performing in-flight tests.

According to one embodiment of the invention, the "other" display computer FTI 140 is contained within an item of equipment for computing and controlling the execution of in-flight tests, configured so as to execute avionic functions other than just displaying on a display device, and the ability to display information on the head-up display device appears to be valuable for performing in-flight tests that contribute for example to validating new avionic functions prior to them being integrated into an aircraft.

Figure 3:
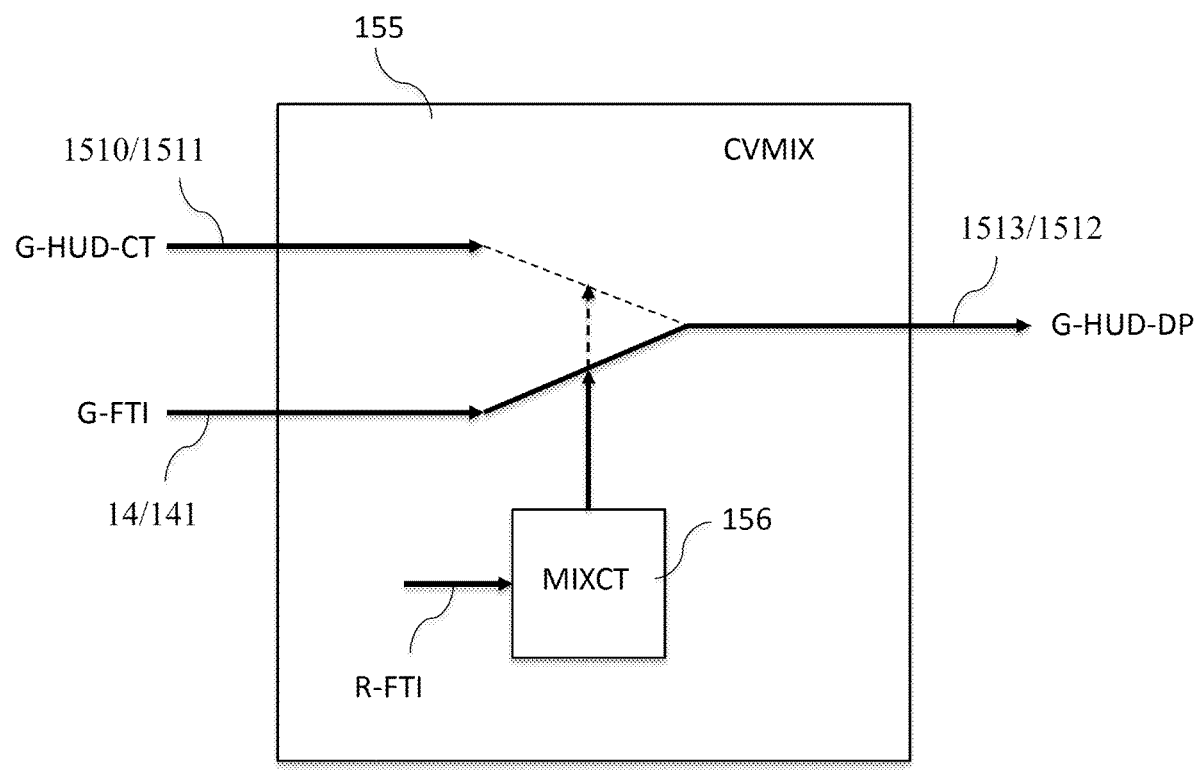
FIG. 3 is a schematic depiction of the architecture of the video mixing device shown in the display system of FIG. 2, according to a first embodiment of the invention.

FIG. 3 schematically illustrates the internal operation of the mixing device

CVMIX 155 configured so as to perform mixing of the first video signal 1511 and the second video signal 141 in order to conditionally deliver the third video signal 1512 depending on the value or on the amplitude of an "internal" control signal R-FTI connected to the red component video signal of an RGB composite video signal delivered by the "other" display computer FTI 140. The red component video signal delivered by the display computer FTI 140 thus acts on a mixing control module MIXCT 156 internal to the mixing device CVMIX 155 so as to control an internal switch so that the third video signal 1512, available at the output of the mixing device CVMIX155, is connected conditionally to the first video signal 1511 or to the second video signal 141 depending on the amplitude or on the value of the red component video signal connected to the internal control signal R-FTI.

According to one embodiment, threshold values or threshold amplitudes of the mixing control signal R-FTI are defined such that, below a first threshold value or threshold amplitude, the third video signal 1512 is representative of the first video signal 1511 and that, beyond a second threshold value or threshold amplitude, the third video signal 1512 is representative of the second video signal 141. According to one variant of the embodiment, the first threshold value and the second threshold value are identical, such that there is then only a single threshold value and that, below this threshold value or this threshold amplitude, the third video signal 1512 is representative of the first video signal 1511 and that, beyond this same threshold value or same threshold amplitude, the third video signal 1512 is representative of the second video signal 141.

Reference is made here to a threshold value or a threshold amplitude depending on whether the internal comparison processing operation is performed on an analogue quantity or on a digital quantity. Independently of the mode of implementation, the terms "threshold value" or "threshold amplitude" are considered here to be equivalent for the understanding of the invention.

Of course, the processing operations internal to the mixing device CVMIX 155 may be implemented partially or fully in digital or analogue form and may require digital-to-analogue or analogue-to-digital conversions depending on the respective formats (analogue or digital) of the first, second and third video signals described.

To facilitate the reading of the figures and the correct understanding of the invention, the first video signal 1511, which is a component coding the color green of an RGB composite video signal originating from the display computer HUD-CT 150, is also called G-HUD-CT. For similar reasons, the second video signal, which is a component coding the color green of an RGB composite video signal originating from the "other" display computer FTI 140, is also called G-FTI.

Figure 4:
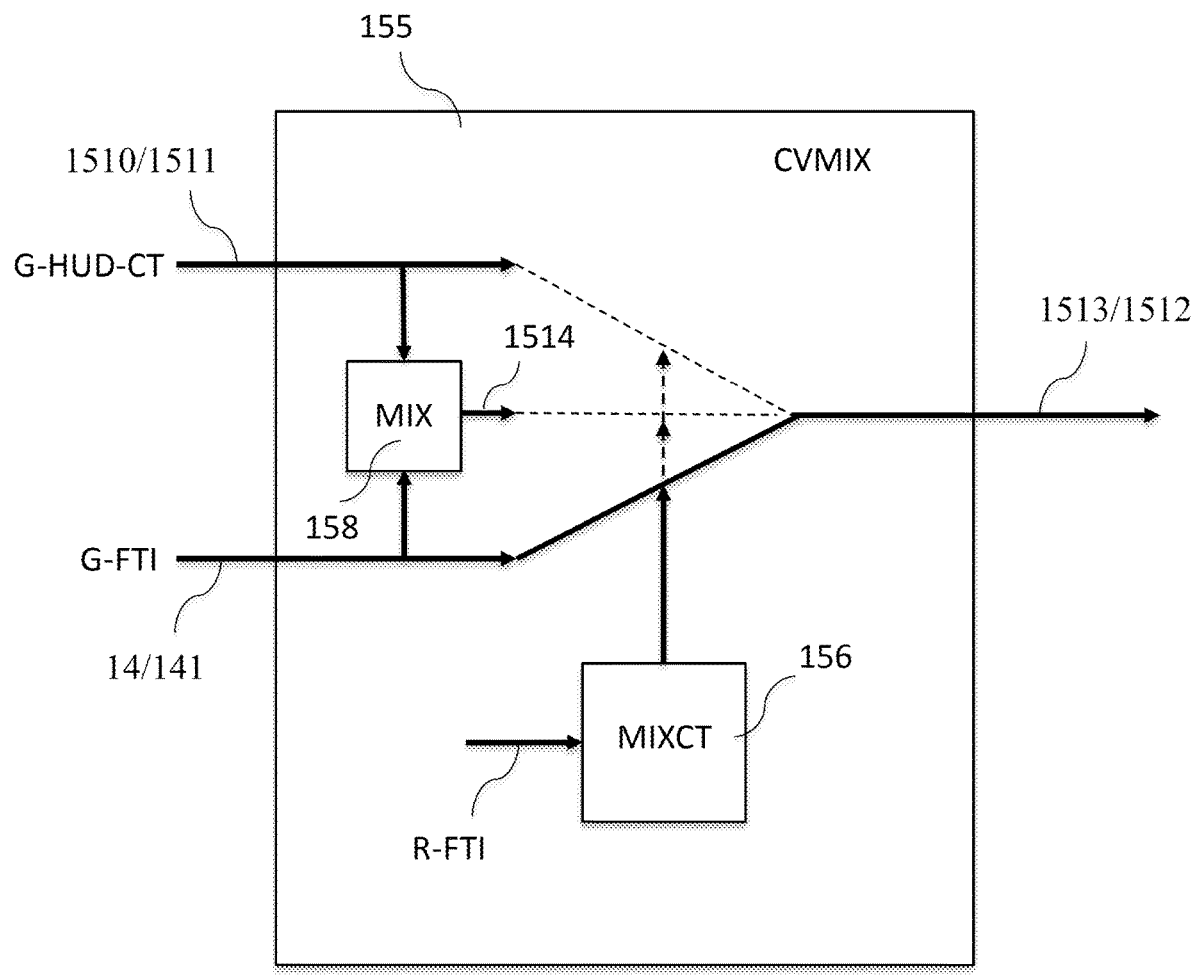
FIG. 4 is a schematic depiction of the architecture of the video mixing device shown in the display system of FIG. 2, according to a second embodiment of the invention.

FIG. 4 illustrates another embodiment of the mixing device CVMIX 155 for which the third video signal, made available at the output of the mixing device, is not only representative of one or the other of the first and second video signals 1511 and 141, but may furthermore be representative of a combination of these two video signals at input, which combination is made by executing a mathematical function such as for example choosing the maximum, choosing the minimum or else the average value of the two video signals 1511 and 141.

The mathematical function is executed by a computing module MIX 158 internal to the mixing device CVMIX 155.

According to this embodiment, two threshold values, different from one another, are predetermined for performing the mixing such that the third video signal 1512 is furthermore representative of a fourth video signal 1514, called intermediate video signal, which is the result of the mathematical function performed based on the first video signal 1511 and the second video signal 141 when the amplitude of the control signal R-FTI is between the first predetermined amplitude threshold and the second predetermined amplitude threshold, or equal to one of the predetermined thresholds.

Thus, as a result, if the control signal R-FTI connected (linked) to the red component of the RGB composite video signal originating from the display computer FTI 140 has a value or an amplitude:
- lower than the first threshold value: the output video signal 1512 is representative of the input video signal 1511,
- greater than the second threshold value: the output video signal 1512 is representative of the input video signal 1511,
- between the two threshold values or equal to one of these two threshold values: the output video signal 1512 is representative of the internal video signal 1514, called intermediate video signal, which results from a combination of the two video signals 1511 and 141 at input, which combination is performed by a mathematical computing function, such as, for example, computing the minimum between the two video signals 1511 and 141, computing the maximum between these two video signals or else the average of the two video signals in terms of value or amplitude.

The exemplary mathematical functions cited above and useful for combining the input video signals 1511 and 141 are not limiting, and other mathematical functions may be used to combine the first and second input video signals depending on the requirements in terms of controlling the display with a view to a display by way of the head-up display device HUD-DP 15.

Figure 5:
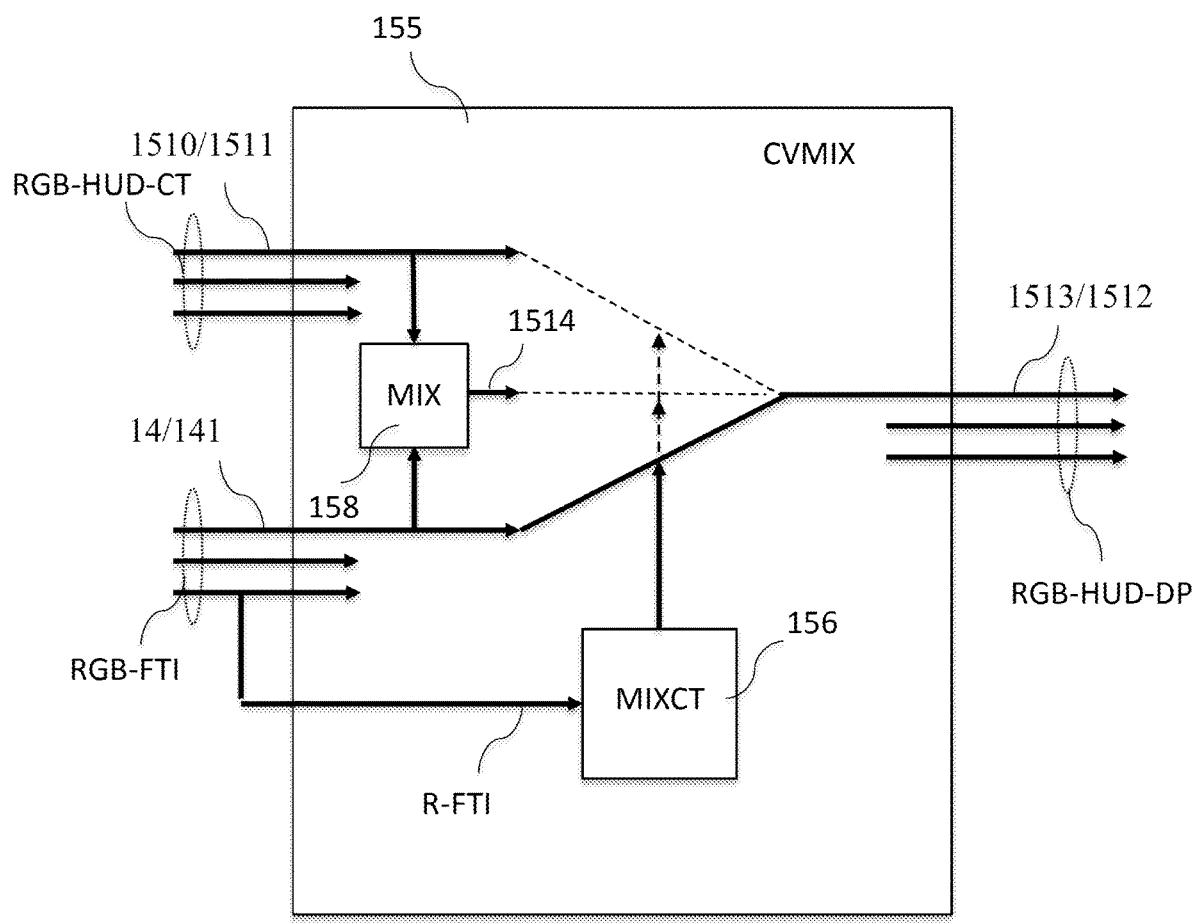
FIG. 5 is a schematic depiction of the architecture of the video mixing device shown in the display system of FIG. 4, configured so as to perform mixing based on composite video signals.

FIG. 5 is a schematic depiction of the mixing device CVMIX 155 illustrating the fact that, according to one embodiment of the invention, the first video signal 1511 is a video component of an RGB composite video signal RGB-HUD-CT that comprises three components, respectively of the type R, G and B. This composite video signal is delivered by the display computer device HUD-CT native to the aircraft. Similarly, FIG. 5 illustrates the fact that, according to this embodiment, the second video signal 141 is a video component of an RGB composite video signal RGB-FTI that comprises three components, respectively of the type R, G and B. This composite video signal is delivered by the "other" display computer device FTI 140 that is dedicated, for example, to in-flight tests. Finally, FIG. 5 illustrates the fact that the third video signal 1512, still according to this embodiment, is a video component of an RGB composite video signal RGB-HUD-DP that comprises three components, respectively of the type R, G and B. This signal constitutes the provision of the information to be rendered on the head-up display device HUD-DP 15 native to the aircraft. FIG. 5 also reveals the clever connection between a component video signal of the composite video signal RGB-FTI and the internal control signal R-FTI, which cleverly makes it possible to control the mixing performed by the mixing device CVMIX 155 from the display computer FTI 140, and therefore to insert additional information to be displayed via the head-up display device HUD-DP 15, without otherwise having to modify one or the other of the devices HUD-CT 150 or HUD-DP 15.

According to one embodiment, when the first video signal, originating from the display computer device HUD-CT 150, is a composite video signal comprising components R1, G1 and B1 and the video signal at the output of the mixing device CVMIX 155 is also a composite video signal comprising components R3, G3 and B3, the output components R3 and B3 are respectively connected to the input components R1 and B1, and only the output component G3 carries a video signal resulting from a mixing operation.

According to one variant of the above embodiment, the components G3 and R3 at the output of the mixing device CVMIX 155 are both representative of the component G1 at the input of the device.

Figure 6:
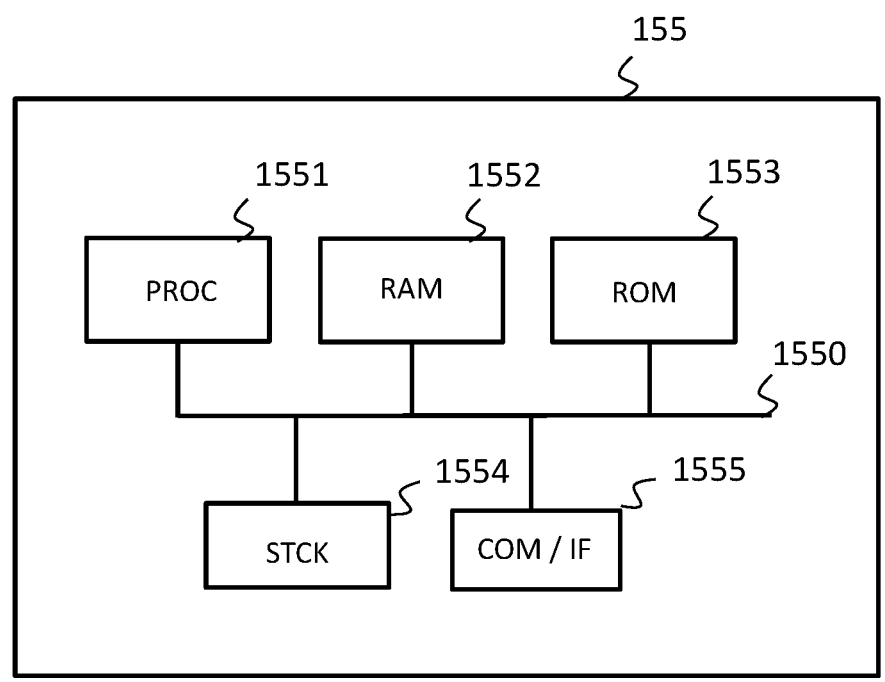
FIG. 6 is a diagram showing one example of an architecture of the digital core of a video mixing device according to one embodiment of the invention.

FIG. 6 schematically illustrates one example of an internal architecture of the mixing device CVMIX 155. It will be considered by way of illustration that FIG. 6 illustrates an internal layout of the mixing device CVMIX 155. It will be noted that FIG. 6 could also schematically illustrate one example of a hardware architecture of a display computer device useful for controlling the flight of the aircraft, for performing in-flight tests, for validating new avionic functions or for any other computing or display function useful on board an aircraft.

According to the example of a hardware architecture shown in FIG. 6, the mixing device CVMIX 155 then comprises the following, connected by a communication bus 1550: a processor or CPU ("central processing unit") 1551; a random access memory RAM 1552; a read-only memory ROM 1553; a storage unit such as a hard drive (or a storage medium reader, such as an SD ("Secure Digital") card reader) 1554; at least one communication interface 1555 furthermore offering input/output port interfaces, in particular so, as to receive and transmit simple or composite video signals and allowing the mixing device CVMIX 155 to communicate with devices present in the control system and, in particular, the display system of an aircraft, such as, for example, the head-up display computer HUD-CT 150 or the display computer FTI 140.

The processor 1551 is capable of executing instructions loaded into the RAM 1552 from the ROM 1553, from an external memory (not shown), from a storage medium (such as an SD card), or attached to a communication network. When the mixing device CVMIX 155 is powered up, the processor 1551 is capable of reading instructions from the RAM 1552 and of executing them. These instructions form a computer program that causes the processor 1551 to implement part of a method described with reference to FIG. 7 or of a method derived therefrom.

All of part of the method implemented by the mixing device CVMIX 155 or its described variants may be implemented in software form through the execution of a set of instructions by a programmable machine, for example a DSP ("digital signal processor") or a microcontroller, or may be implemented in hardware form by a machine or a dedicated component, for example an FPGA ("field-programmable gate array") or an ASIC ("application-specific integrated circuit"). In general, the mixing device CVMIX 155 comprises electronic circuitry configured so as to implement the method described in relation therewith, and with the display computer devices HUD-CT 150 and FTI 140. Of course, the mixing device CVMIX 155 furthermore comprises all of the elements that are usually present in a system comprising a control unit and its peripherals, such as a power supply circuit, a power supply monitoring circuit, one or more clock circuits, a reset circuit, input/output ports, interrupt inputs, bus drivers, digital-to-analogue and analogue-to-digital converters, ideally fast ones. This list is non-exhaustive.

Figure 7:
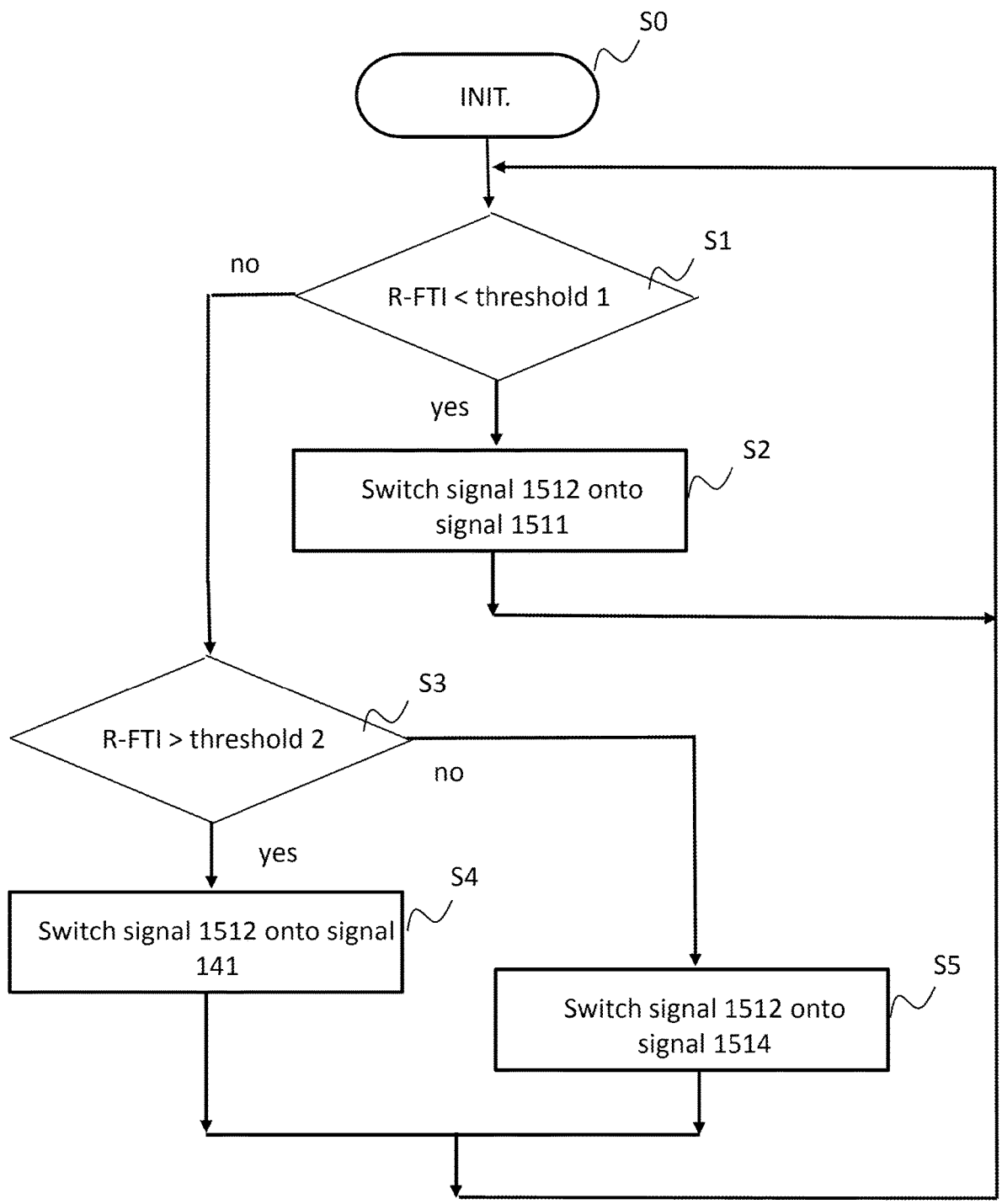
FIG. 7 is a flowchart illustrating a video signal mixing method implemented by the mixing device shown in FIG. 3, FIG. 4, FIG. 5 and FIG. 6, according to one embodiment; and, FIG. 8 is a schematic depiction of an aircraft comprising a display system, the system comprising a video mixing device according to one embodiment.

FIG. 7 illustrates a mixing method implemented by the mixing device CVMIX 155 according to one embodiment. An initialization step S0 makes it possible to initialize all of the systems of an aircraft, comprising the display system 100 and therefore the mixing device CVMIX 155. At the end of this step, all of the elements of the system are therefore normally operational and interact with one another in order to perform in particular display functions useful for conducting a flight, for movements on the ground or even for on-the-ground or in-flight tests. The mixing device CVMIX 155 is configured so as to read the value or the amplitude of the internal control signal R-FTI, which, for example and according to the preferred embodiment, is none other than the R component video signal (coding the color red) of an RGB composite signal originating from the display computer FTI 140 of an in-flight test controller. A first value or amplitude threshold and a second value or amplitude threshold are predetermined, and the current value of the control signal R-FTI (red component of the video originating from the display computer FTI 140) is compared for each of the pixels that form an image to be displayed with one or with both predetermined thresholds. For example, the first threshold is set at ⅓ of the maximum amplitude of the signal R-FTI admissible at the input of the mixing device CVMIX 155 if the reading and/or the comparison is performed in an analogue manner, or else at a value equal to ⅓ of the maximum value that is able to be coded if the reading is performed digitally Similarly, the second threshold is set at ⅔ of the maximum amplitude of the signal R-FTI admissible at the input of the mixing device CVMIX 155 if the reading and/or the comparison is performed in an analogue manner, or else at a value equal to ⅔ of the maximum value that is able to be coded if the reading is performed digitally. Of course, the first and second thresholds may be set differently, and they may be assigned values other than ⅓ and ⅔ of the maximum. For example, the first threshold may be defined at a value equal to 90% of the maximum value that is admissible or that is able to be coded digitally, and the second threshold may be defined at a value equal to 95% of the maximum value that is admissible or that is able to be coded digitally. According to one embodiment of the invention, the video signals compared with one or more thresholds are digital or converted into a digital format and coded on 8 bits, so as each to be able to be represented by a value between 0 and 255 in decimal. According to this embodiment of the invention, the first threshold has a determined (predefined) value equal to 100 and the second threshold has a determined (predefined) value of 200. According to yet another embodiment of the invention, the values of the first and second predetermined thresholds are able to be programmed and adjusted dynamically and are transmitted by a configuration data bus. Cleverly, the configuration data bus for configuring the threshold values may be another video component signal of the composite signal RGB-FTI originating from the display computer FTI 140.

Thus, in a step S1, the mixing device CVMIX 155 performs a comparison aimed at determining whether the control signal R-FTI, that is to say, in other words, the red video component of the composite video signal RGB-FTI originating from the display computer FTI 140, is lower than the first predetermined threshold. If this is the case, the third video signal 1512 is switched onto the first input video signal 1511 originating from the head-up display computer HUD-CT 150 in a step S2. If not, the value of the signal R-FTI is compared with the second threshold in a step S3 in order to determine whether it is greater than this second threshold. The switching operation may be performed either by way of a controlled physical connection or by producing a copy of the signal, in analogue or digital form. If this is the case, the third video signal 1512 is switched onto the second input video signal 141 originating from the display computer FTI 140, dedicated for example to in-flight tests, in a step S4. If not, this means that the value of the signal R-FTI or its amplitude is between the two predetermined threshold values or equal to one of them (since it is neither lower than the first threshold nor greater than the second threshold), and in this case the third video signal 1512 is switched onto the fourth video signal, called intermediate video signal, which results from a combination of the first and second input video signals, respectively 1511 and 141.

According to one embodiment, the combination of the signals is defined by the execution of a mathematical function by the module MIX 158, which function is chosen by programming the mixing device CVMIX 155. This programming is performed for example by a configuration bus, under the control of a remote command unit, for example a command unit integrated into the display computer FTI 140.

A test and mixing loop (or more precisely loop for configuring the video switch internal to the device CVMIX 155), running successively through steps S1, S2, or else S1, S3, S4, or else S1, S3, S5, is implemented for each of the pixels or elementary points of a transmitted image to be displayed. The details regarding synchronizing the video signals with one another, or with respect to a reference clock, and the internal processing operations with respect to the images, are not described in more detail here since they are well known to a person skilled in the art in the field of videos, and more generally signal processing, and since they are not useful for understanding the invention described here.

According to one embodiment of the invention, when no video signal originating from the "other" display computer FTI 140 is detected, the mixing device CVMIX 155 blocks the video signal 1512 at output, and possibly the whole composite video signal RGB-HUD-DP, for example by defining the respective values of the components of this signal, or else their respective amplitudes, at zero.

Figure 8:
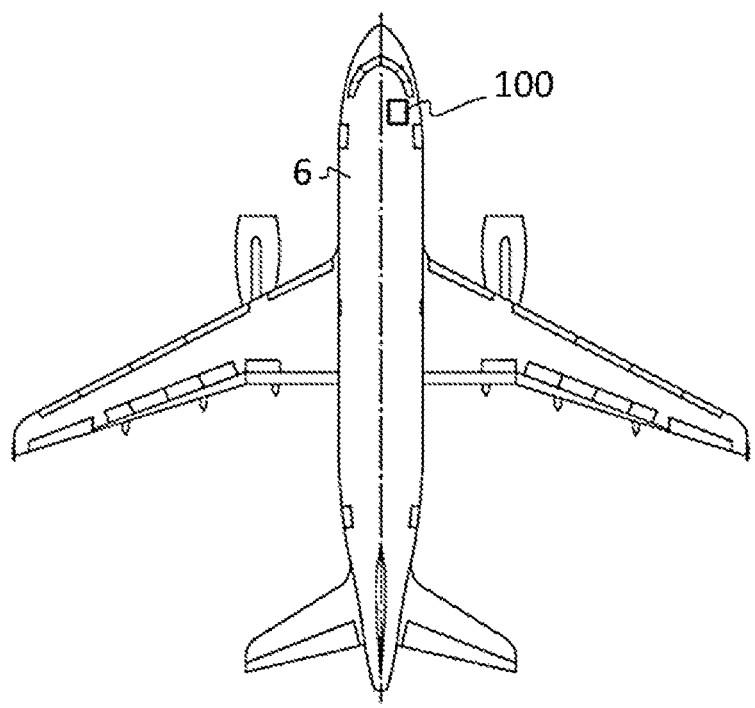

FIG. 8 illustrates an aircraft 6 comprising a display system 100 similar to the one shown in FIG. 2 and that comprises the mixing device CVMIX 155 according to one embodiment.

The invention is not limited to just the embodiments and examples described above, but relates to any method for mixing two video signals in which a first originates from a display computer native to an aircraft and the other originates from "another" display computer, the mixing being conditionally and cleverly performed on the basis of the value or the amplitude of a mixing control signal, which is a video component of a composite video signal originating from another display computer.

According to one variant, the display controlled by the mixed video signal (at the output of the mixing device) is any display in the cockpit of an aircraft. Furthermore, the described embodiments may be combined with one another when this is meaningful, for example, the video signals presented at the input of the mixing device CVMIX 155 may be RGB composite video signals and the video signal delivered at the output of the mixing device CVMIX 155 may be a single component coding the color green.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A display system comprising:
   a head-up display installed natively on board an aircraft,
   a first display computer installed natively on board the aircraft, a second display computer for displaying information linked to at least one of in-flight test parameters or conditions, and
   a mixing device for mixing a first video signal and a second video signal to form a third video signal, the mixing device comprising electronic circuits configured such that the third video signal is representative of the first video signal when the amplitude of a control signal is lower than a first predetermined threshold and such that the third video signal is representative of the second video signal when an amplitude of said control signal is greater than a second predetermined threshold,
   wherein the first video signal is generated by the first display computer, the second video signal is generated by the second display computer and the third video signal is configured to control a display on the head-up display.

2. The display system according to claim 1, wherein the electronic circuits are configured such that the third video signal is furthermore representative of a fourth video signal, called intermediate video signal, which results from a function performed based on the first video signal and the second video signal when the amplitude of said control signal is between said first predetermined amplitude threshold and said second predetermined amplitude threshold, or equal to one of said predetermined thresholds.

3. The display system according to claim 1,
   wherein the first video signal is a component of a first composite video signal and the second video signal is a component of a second composite video signal, and
   wherein said control signal is a component of the first composite video signal other than the first video signal or else a component of the second composite video signal other than the second video signal.

4. The display system according to claim 2, wherein the function performed based on the first video signal and based on the second video signal is chosen from among: minimum, maximum, average.

5. The display system according to claim 2,
   wherein the first composite video signal and the second composite video signal each comprise three components respectively coding a color red, a color green and a color blue,
   wherein the control signal is a component coding the color red of the second composite video signal, and
   wherein the third video signal is a component coding the color green of a third composite video signal.

6. An aircraft comprising the display system according to claim 1.

7. A method for mixing a first video signal and a second video signal to form a third video signal, the method being executed in a video mixing device comprising electronic circuits, the method comprising
   configuring a third video signal to control a display on a head-up display device to be representative of a first video signal when the amplitude of a control signal is lower than a first predetermined threshold and so that the third video signal is representative of a second video signal when the amplitude of said control signal is greater than a second predetermined threshold,
   respectively delivering the first and second video signals by a head-up display computer and a second display computer.

8. A computer program product, comprising program code instructions for executing the steps of the method according to claim 7 when said program is executed by a processor.

9. An information storage medium comprising a computer program product according to claim 8.

* * * * *